United States Patent [19]
Becraft, Jr. et al.

[11] Patent Number: 6,098,075
[45] Date of Patent: *Aug. 1, 2000

[54] DEFERRED REFERENTIAL INTEGRITY CHECKING BASED ON DETERMINING WHETHER ROW AT-A-TIME REFERENTIAL INTEGRITY CHECKING WOULD YIELD THE SAME RESULTS AS DEFERRED INTEGRITY CHECKING

[75] Inventors: Richard Vincent Becraft, Jr., San Jose; Robert William Engles, deceased, late of San Jose, by Margaret Mary Engles, administratrix; Claire Louise Willey McFeely; San Yu Phoenix, both of San Jose; Kalpana Shyam, Los Altos; Julie Ann Watts, Morgan Hill, all of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,291

[22] Filed: Dec. 16, 1997

[51] Int. Cl.[7] .................................................... G06F 17/30

[52] U.S. Cl. ........................... 707/201; 707/2; 364/282.1; 364/283.4

[58] Field of Search .................................... 707/200, 202, 707/201, 2; 364/282.1, 283.4

[56] References Cited

U.S. PATENT DOCUMENTS

| | | |
|---|---|---|
| 4,833,679 | 5/1989 | Anderson et al. . |
| 4,933,848 | 6/1990 | Haderle et al. . |
| 4,947,320 | 8/1990 | Crus et al. . |
| 5,226,158 | 7/1993 | Horn et al. . |
| 5,497,486 | 3/1996 | Stolfo et al. . |
| 5,546,576 | 8/1996 | Cochrane et al. . |

OTHER PUBLICATIONS

Jukka Teuhola, "deferred maintenance of replicated objects", IEEE, pp. 476–481, Jan. 1996.
Chundi et al., "Deferred updates and data placement in distributed databases", IEEE, pp. 469–476, Jan. 1996.
Victor M. Markowitz, "A relation merging technique for relational databases", IEEE, pp. 428–437, Jan. 1992.
Urpi et al., "Semantic change computation optimization in active database", IEEE, pp. 19–27, Jan. 1994.
Albert et al., "Automatic importation of relational schemas in pegasus", IEEE, pp. 105–113.
Quass et al., "Making views self maintainable for data warehousing", pp. 158–169, Jan. 1996.
Bruce M. Horowitz, "Arun time execution model referential integrity maintenance", IEEE, pp. 548–556, Jan. 1992.
Mukhopahyay et al., "Practical approaches to maintaining referential integrity in multidatabase systems", IEEE, pp. 42–49.
IBM Technical Disclosure Bulletin, "Relationships: Improved Integrity for Relational–Based Computer Aided Design/Computer Aided Manufacturing/Geographic Information Systems", vol. 39, No. 12, pp. 241–246, Dec. 1996.

(List continued on next page.)

*Primary Examiner*—Hosain T. Alam
*Assistant Examiner*—Jean M. Corrielus
*Attorney, Agent, or Firm*—Pretty, Schroeder & Poplawski, P.C.

[57] ABSTRACT

A method, apparatus, and article of manufacture for a computer implemented data manager. A statement is executed in a computer. The statement being performed by the computer to access data from a database stored on a data storage device connected to the computer. A determination is made as to whether to defer referential integrity checking when executing the statement. When it is determined that referential integrity checking is to be deferred, each record is processed that is specified in the statement. Keys for select records are stored as each record is processed. Then, after executing the statement, referential integrity checking is performed on the stored keys.

42 Claims, 6 Drawing Sheets

OTHER PUBLICATIONS

IBM Technical Disclosure Bulletin, "Referential Integrity Implementation Details And Advantages", vol. 38, No. 3, pp. 477–487, Mar. 1995.

Stephanie Cammarata, et al., "Extending a Relational Database With Deferred Referential Integrity Checking And Intelligent Joins", ACM, pp. 88–97, 1989.

VAX Rdb/VMS Reference Manual, pp. 43–46, Dec. 1984.

Bill Noyce, "Component Software Product—Specification For VAX–11 RDMS V1.0", Digital Equipment Corporation, pp. 22–23, Sep. 28, 1982.

Bruce M. Horowitz, "Update Anomalies For Referential Integrity Schemes", Bell Communications Research, pp. 1–3, Sep. 19, 1986.

Burce M. Horowitz, "Propagating Multi–Column Primary Key Updates", Bell Communications Research, pp. 1–4, Nov. 13, 1986.

L. Sailagner, "Referential Integrity", pp. 1–17, Nov. 24, 1986.

Phil Shaw, "Referential Integrity Changes", pp. 1–7, Jan. 31, 1986.

Phil Shaw, Referential Integrity Change, pp. 1–9, May 30, 1986.

Laila G. Robinson, et al., "A Cursory Review of SQL Addendum–1," pp. 1–6, Jul. 22, 1986.

Laila G. Robinson, "ANSI Extended SQL Issues And Questions", pp. 1–3 with Figures 1 and 2), Jun. 5, 1986.

Tony Hatoun, "The Data Consistency Conundrum: Deferred Versus Immediate Checking", Journal of Information Systems Management, vol. 6, No. 3, pp. 65–67, 1989.

Rainer Eberhard, et al., "DB2 Referential Integrity Performance", IBM Corporation, 1989.

DEFERRED REFERENTIAL INTEGRITY CHECKING BASED ON DETERMINING WHETHER ROW AT-A-TIME REFERENTIAL INTEGRITY CHECKING WOULD YIELD THE SAME RESULTS AS DEFERRED INTEGRITY CHECKING

BACKGROUND OF THE INVENTION

1. Field of the Invention

This invention relates in general to computer-implemented database systems, and, in particular, to deferred referential integrity checking.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semipermanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

A table can have a key, which uniquely identifies each row in the table. For example, for an Employee table that holds employee information, a social security number column could be the parent key. When the key is referenced in a referential integrity relationship, the key is said to be a "parent" key. The parent key could be made up of one or more columns and is defined by a developer who creates the table. Additionally, a key (a "foreign" or "dependent" key) in one table (a "dependent" or "child" table) can reference a key in other tables, called parent tables. The foreign key matches a parent key in the parent table. That is, relationships between tables are made through the values in the columns, and the columns that maintain this link are foreign keys. Referential integrity requires that every non-NULL foreign key value in a dependent table must have a matching parent key value in a parent table. For example, if a company has various offices, a Company table could have a Branch column as a parent key, and then an Employee table could have a foreign key that references the Branch column, indicating the branch at which a particular employee works. Referential integrity checking involves ensuring that foreign key values match parent key values. Therefore, when a parent key is updated or deleted, referential integrity checking ensures that corresponding foreign keys have been updated or deleted.

When a set of records are being deleted or updated, in tables involved in referential integrity relationships, the order in which the rows are updated or deleted may determine whether the delete or update will be successful. This order is determined based on the access path selected, which, in turn, depends on performance and other considerations. This is true if referential integrity checking is performed as each row is updated or deleted. When referential integrity checking is unsuccessful, the execution of the SQL statement is aborted and the table is returned to its original form. Some systems avoid this problem by restricting the execution of certain SQL statements, such as deleting from a self-referencing table and multiple-row updates on parent keys.

There is a need in the art for an improved method of referential integrity checking that would avoid unnecessary abortion of the execution of SQL statements.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented data manager.

In accordance with the present invention, a statement is executed in a computer, where the statement is performed by the computer to access data from a database stored on a data storage device connected to the computer. A determination is made as to whether to defer referential integrity checking when executing the statement. When it is determined that referential integrity checking is to be deferred, each record is processed that is specified in the statement. Keys for select records are stored as each record is processed. Then, after each of the records is processed, referential integrity checking is performed on the stored keys.

An object of the invention is to provide deferred referential integrity checking. Another object of the invention is to defer referential integrity checking when executing a delete rule for a self-referencing table. Yet another object of the invention is to defer referential integrity checking for multiple-row updates of a parent key. An additional object of the invention is to defer referential integrity checking when modifying tables in which foreign keys reference unique keys.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
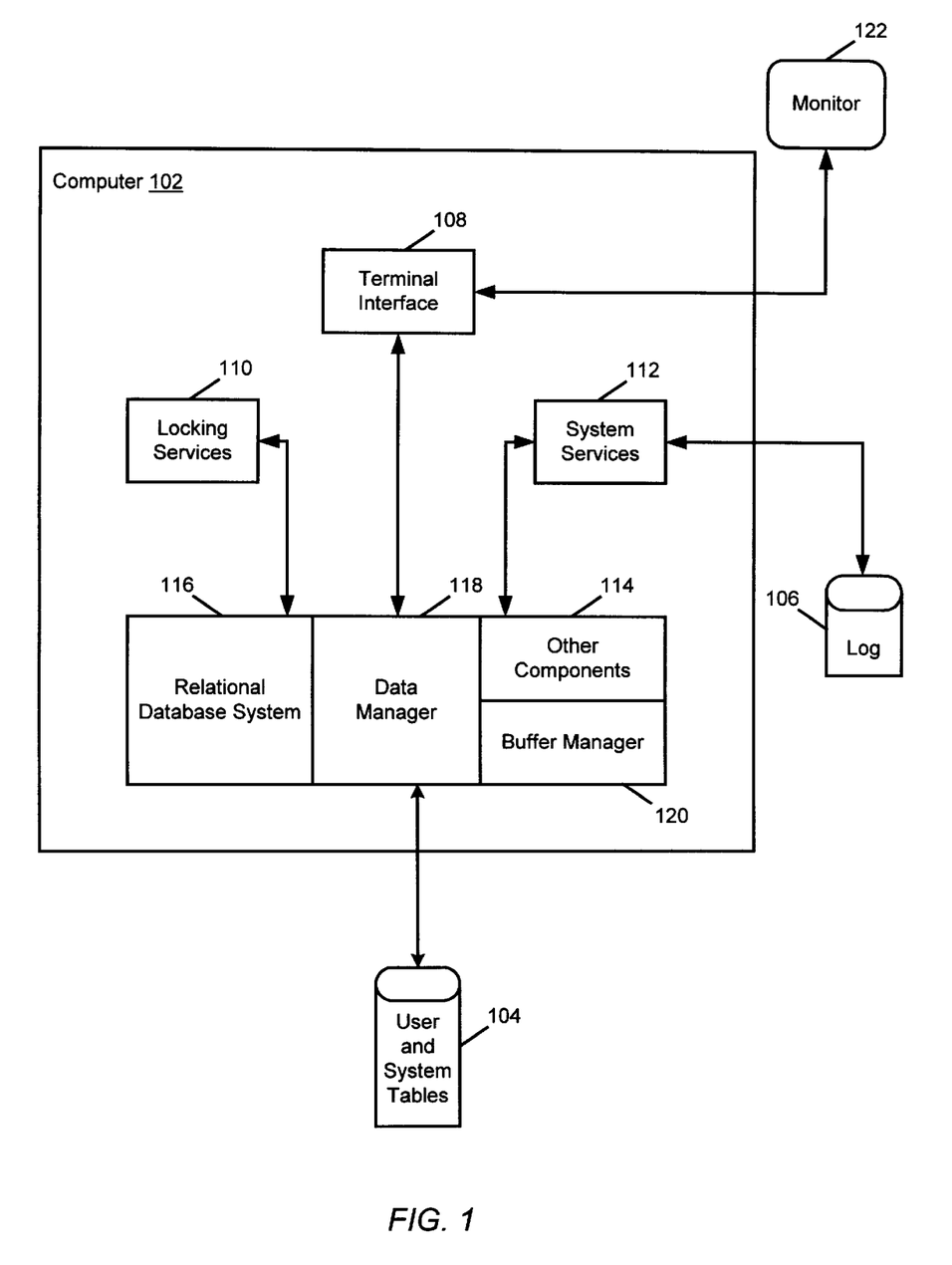
FIG. 1 illustrates an exemplary computer hardware environment that could be used with the present invention.

FIG. 1 illustrates an exemplary computer hardware environment that could be used with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC, CICS, TSO, OS/390 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/390 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Deferred Referential Integrity Overview

The present invention determines when referential integrity checking is to be performed. The present invention selects row-at-a-time referential integrity checking when that would yield the same results as deferring referential integrity checking. In particular, the present invention determines that referential integrity checking can be deferred in the following three situations:

DELETE rule on a Self-Referencing Table

Multiple-row UPDATE of Parent Keys

UPDATE OR DELETE on a Table for which Foreign keys Reference UNIQUE keys

Moreover, the present invention provides a unique technique for deferring referential integrity checking. During the execution of any one of the above SQL UPDATE or DELETE operations, any violating rows are tracked in a work file by the combination of the parent or foreign key and the relationship constraint. Since each table can have multiple constraints, the work files are tracked in a control block in memory. This list of keys is an all-inclusive list that contains all the relevant keys that are affected by the SQL statement. After the last row of a table is processed, the accumulated list is checked for referential integrity violations. At the end of the updates and deletes, the control block is used to access the work files and run through referential integrity checking.

Referential integrity checks are performed to ensure that no foreign keys remain that reference parent keys that no longer exist. For all the foreign keys that are being updated, referential integrity checks are performed to ensure that the new values have a corresponding parent key. If all the rows in the list pass this check, the statement is successful, otherwise, the entire statement will be rolled back at the first violation detection.

The present invention avoids the problems that arise in some systems by deferring referential integrity checking until all specified rows of a table are updated or deleted. When referential integrity checking is deferred, it is possible that the update or delete could eliminate the rows that violate referential integrity prior to the checking being performed, thus allowing the referential integrity checking to be successful.

First, when a DELETE rule is specified for a self-referencing table, referential integrity checking is deferred. In a self-referencing table, a foreign key of one row references a parent key in another row of the table. If a table is self-referencing, the order in which the rows are deleted can vary depending on the access path selected. With the DELETE rule for self-referencing tables, the referential integrity checking is performed after all the qualifying rows have been deleted, so that the order in which the rows are deleted will not matter.

Second, when a parent key column is updated in multiple rows or when rows of a parent table are updated or deleted when a foreign key references a UNIQUE key in a parent table, referential integrity checking is deferred. After all of the updates and deletes are performed, referential integrity checking is performed. Moreover, when a foreign key is updated or deleted, the referential integrity checking is performed against the corresponding UNIQUE key in the parent table (not necessarily against the parent key). The updated or deleted foreign keys are stored in a work file. Furthermore, when a UNIQUE key in a parent table is updated or deleted, referential integrity checking is performed against the corresponding child (i.e., dependent) tables to ensure that the table does not contain any orphan rows (i.e., rows containing foreign keys whose parent key does not exist).

A DELETE on a Self-Referencing Table

When a DELETE rule is specified for a self-referencing table, referential integrity checking is deferred. If a table is self-referencing, the order in which the rows are deleted can vary depending on the access path selected. When referential integrity checking is performed after all the qualifying rows have been deleted, the order in which the rows are deleted will not matter. The following TABLE 1 illustrates a self-referencing table:

TABLE 1

| COL1 (Parent key) | COL2 | COL3 (Foreign key references COL1) |
| --- | --- | --- |
| A | 1 | A |
| B | 2 | A |
| C | 3 | B |
| D | 4 | B |
| E | 5 | A |
| F | 5 | E |
| G | 5 | F |
| H | 8 | A |
| I | 9 | H |
| J | 3 | H |
| K | 1 | H |

Figure 2:
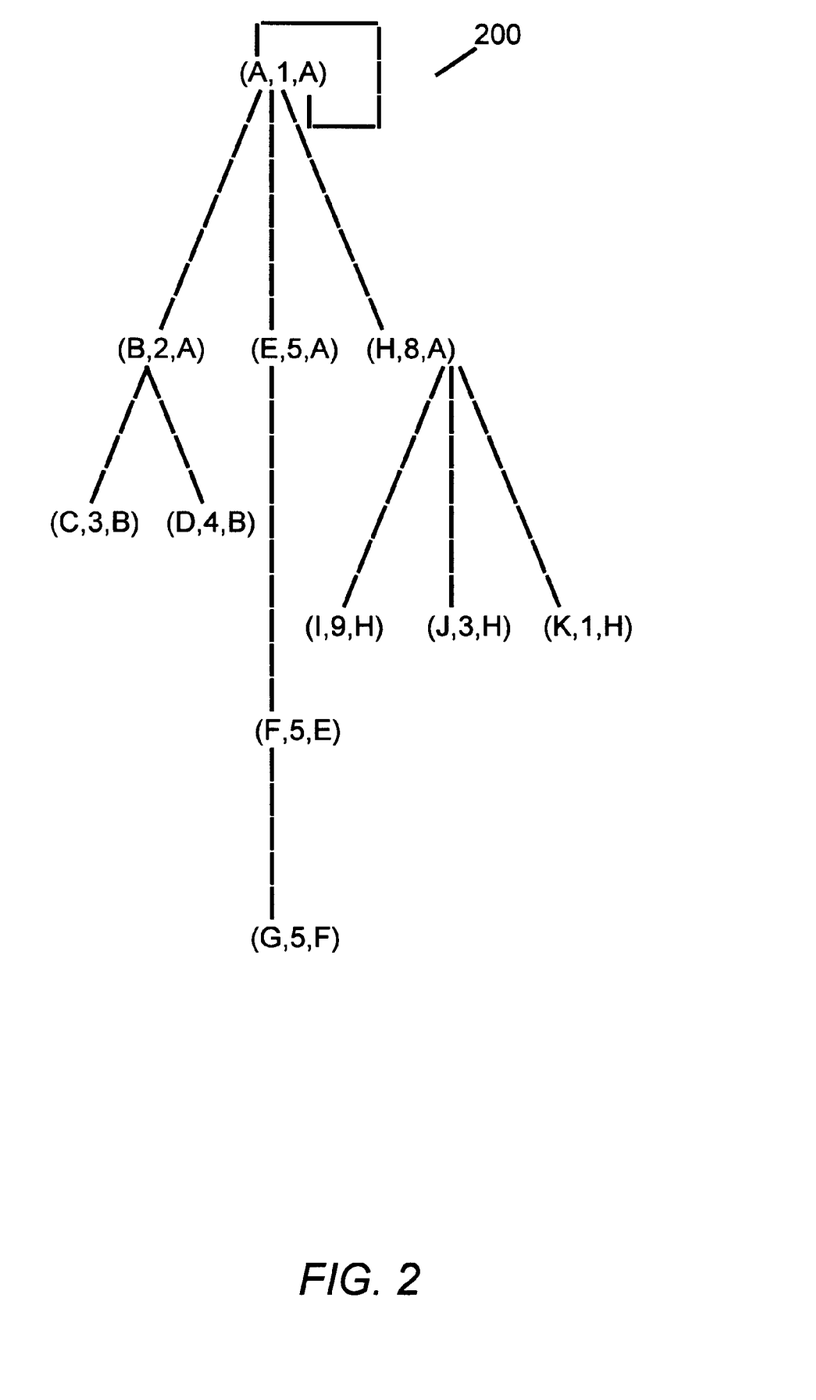
FIG. 2 illustrates a graphical representation of the data of TABLE 1, using a tree structure.

FIG. 2 illustrates a graphical representation of the data of TABLE 1, using a tree structure 200, in which each node represents a row (COL1, COL2, COL3), such as (A,1,A). Dependent rows (i.e., rows that reference a parent key of another row) are placed under the parent rows (i.e., the row whose parent key is referenced), except for row (A,1,A), which is a dependent of itself.

Consider the following SQL statement in reference to the above TABLE 1 and tree structure:

DELETE FROM T WHERE COL2=5;

When referential integrity checking is deferred on the above DELETE statement, the success of the delete does not depend on the order of execution. In fact, the Data Manager 118 will delete all the specified (i.e., selected) rows and then check for referential integrity.

In the following example, TABLE 2 duplicates TABLE 1, except that row (B,2,A) has been changed to (B,5,A).

TABLE 2

| COL1 (Parent key) | COL2 | COL3 (Foreign key references COL1) |
| --- | --- | --- |
| A | 1 | A |
| B | 5 | A |
| C | 3 | B |
| D | 4 | B |

TABLE 2-continued

| COL1 (Parent key) | COL2 | COL3 (Foreign key references COL1) |
| --- | --- | --- |
| E | 5 | A |
| F | 5 | E |
| G | 5 | F |
| H | 8 | A |
| I | 9 | H |
| J | 3 | H |
| K | 1 | H |

Then, the following statement is executed:

DELETE FROM T WHERE COL2=5;

The above statement would be unsuccessful with a DELETE rule on the self-referencing table. In this case, the Data Manager 118 first deletes all four qualifying rows, (B,5,A), (E,5,A), (F,5,E), (G,5,F), and then performs referential integrity checking. The referential integrity checking will be unsuccessful because rows (C,3,B) and (D,4,B) would be orphans (i.e., if row (B,5,A) were deleted, then foreign keys that reference the parent key "B" would exist). When the referential integrity checking is unsuccessful, the Data Manager 118 will back out all the deletes and return an error (e.g., "THE RELATIONSHIP constraint-name RESTRICTS THE DELETION OF THE ROW WITH RID X rid-number").

High Level Design

In one embodiment, the DELETE rule on a self-referencing table leads to deferred referential integrity checking for what is termed a "DELETE rule of NO ACTION". The DELETE rule of NO ACTION has the same effect as a DELETE rule of RESTRICT, except when the deleted rows belong to a self-referencing table. A DELETE rule of RESTRICT will not allow a row in a parent table to be deleted when there are still rows in the dependent table whose foreign key corresponds to the parent key of the parent table.

The DELETE rule of RESTRICT causes referential integrity checking to be performed as the rows are deleted. Therefore, in the case of self-referencing tables, where the order in which the rows are processed affects the success of referential integrity checking, the DELETE rule of RESTRICT is not allowed. With the DELETE rule of NO ACTION for self-referencing tables, the referential integrity checking is performed after all the qualifying rows have been deleted, so that the order in which the rows are deleted will not matter.

One or more rows of a self-referencing table can be deleted with a DELETE rule of NO ACTION. One or more rows of a non self-referencing table can also be deleted with a DELETE rule of NO ACTION, however, in these cases, the delete will have the same effect as a DELETE rule of RESTRICT.

The Data Manager 118 enforces the NO ACTION rule in delete processing. When the Data Manager 118 checks for and finds a (RESTRICT or (NO ACTION and—self-referencing)), the Data Manager 118 processes the delete as a DELETE rule of RESTRICT.

The Data Manager 118 also checks for (NO ACTION and self-referencing) tables, in which case a delete is processed as a DELETE rule of NO ACTION, with deferred referential integrity checking. Each data row specified in the DELETE and that row's index will be deleted and processing will continue, even if the row contains a parent key, until all the rows in that table and its dependent tables are processed. The deleted rows that contain parent keys are tracked in an array referenced by a pointer. The array will describe work files in which the actual parent keys are saved. At the end, the Data Manager 118 will use this array and the work files to determine whether there are still some orphans left in the table. However, when referential integrity checking is deferred until all of the rows to be deleted are processed, there is a good chance that all the potential orphans have also been deleted. If there are no orphans, the delete is successful. If there are any orphans left at the end, all the deletes are backed out in a typical manner and an error message is returned.

The following pseudocode represents the technique used to defer referential integrity checking for a DELETE rule on a self-referencing table:

1. For each row of the table T to be deleted:
   a. If the row is not a parent row, delete the row. (i.e., the parent key of the row is not referenced by another row)
   b. If the row is a parent row, (i.e., the parent key of the row is referenced by another row)
      1) Delete the row's entry from the index and delete the row,
      2) Put the Parent Key in the work file.
2. For each Key in the work file:
   a. Identify the Parent Key of each dependent row for the Parent Key (if any), and
   b. If any identified Parent Key is in the index, back out and return error.

This technique is built around already existing DELETE logic. The highlights of the changes and some deviations from the original technique include the following:

The creation of a referential integrity work file control block when a problem row is first encountered while executing a DELETE rule for a self-referencing table.

The processing of a referential integrity work file control block and related work files.

While processing the table, deleting the index and the data of a row containing a parent key and adding the row and work file information to the referential integrity work file.

At the end of processing the table, deletion of the referential integrity work file control block and related work files.

Figure 3:
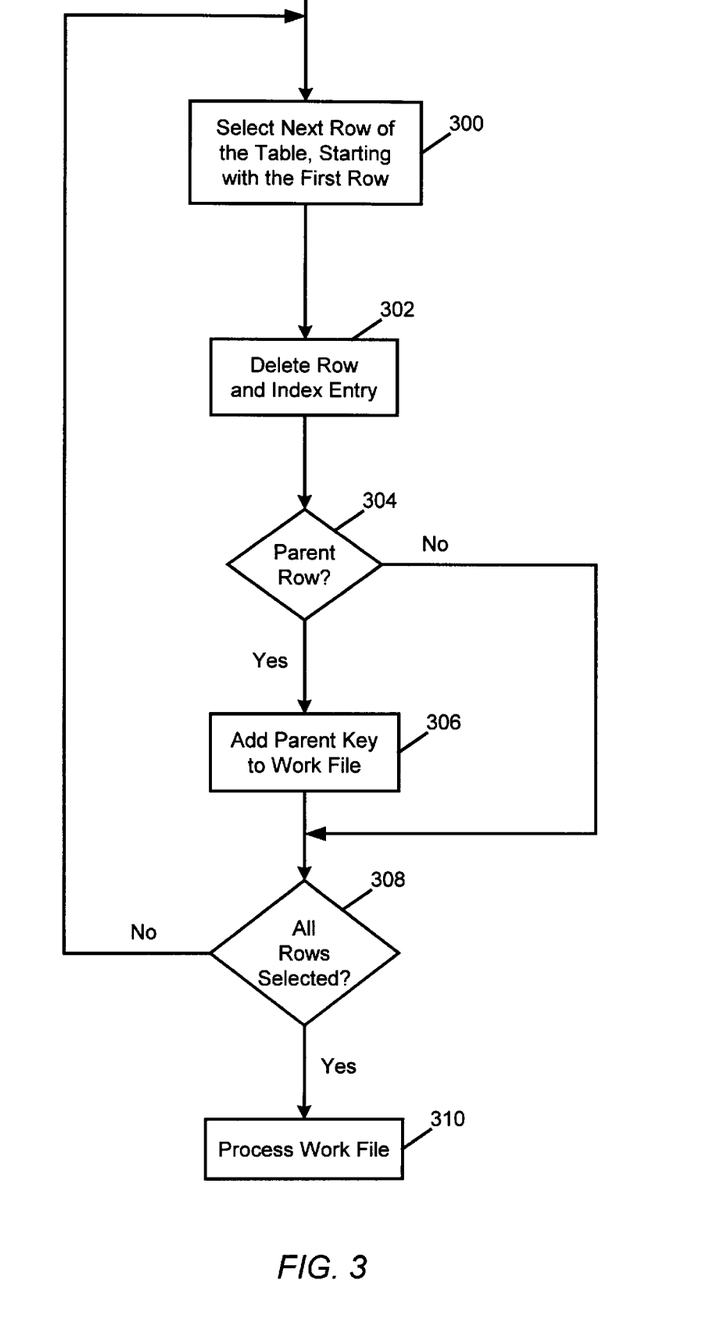
FIG. 3 is a flow diagram illustrating the steps performed by the Data Manager to process a DELETE rule on a self-referencing table.

FIG. 3 is a flow diagram illustrating the steps performed by the Data Manager 118 to process a DELETE rule on a self-referencing table. In Block 300, the Data Manager 118 selects the next row of the table, starting with the first row. In Block 302, the Data Manager 118 deletes the row and its index entry. In Block 304, the Data Manager 118 determines whether the row is a parent row. When the row is not a parent row, the Data Manager 118 continues at Block 308, otherwise, the Data Manager 118 continues at Block 306. In Block 306, the Data Manager 118 adds the parent key of the selected row to a work file. In Block 308, the Data Manager 118 determines whether all rows have been selected. When all rows have been selected, the Data Manager 118 continues to Block 310, otherwise, the Data Manager 118 loops back to Block 300 to select the next row. In Block 310, the Data Manager 118 processes the work file.

Figure 4:
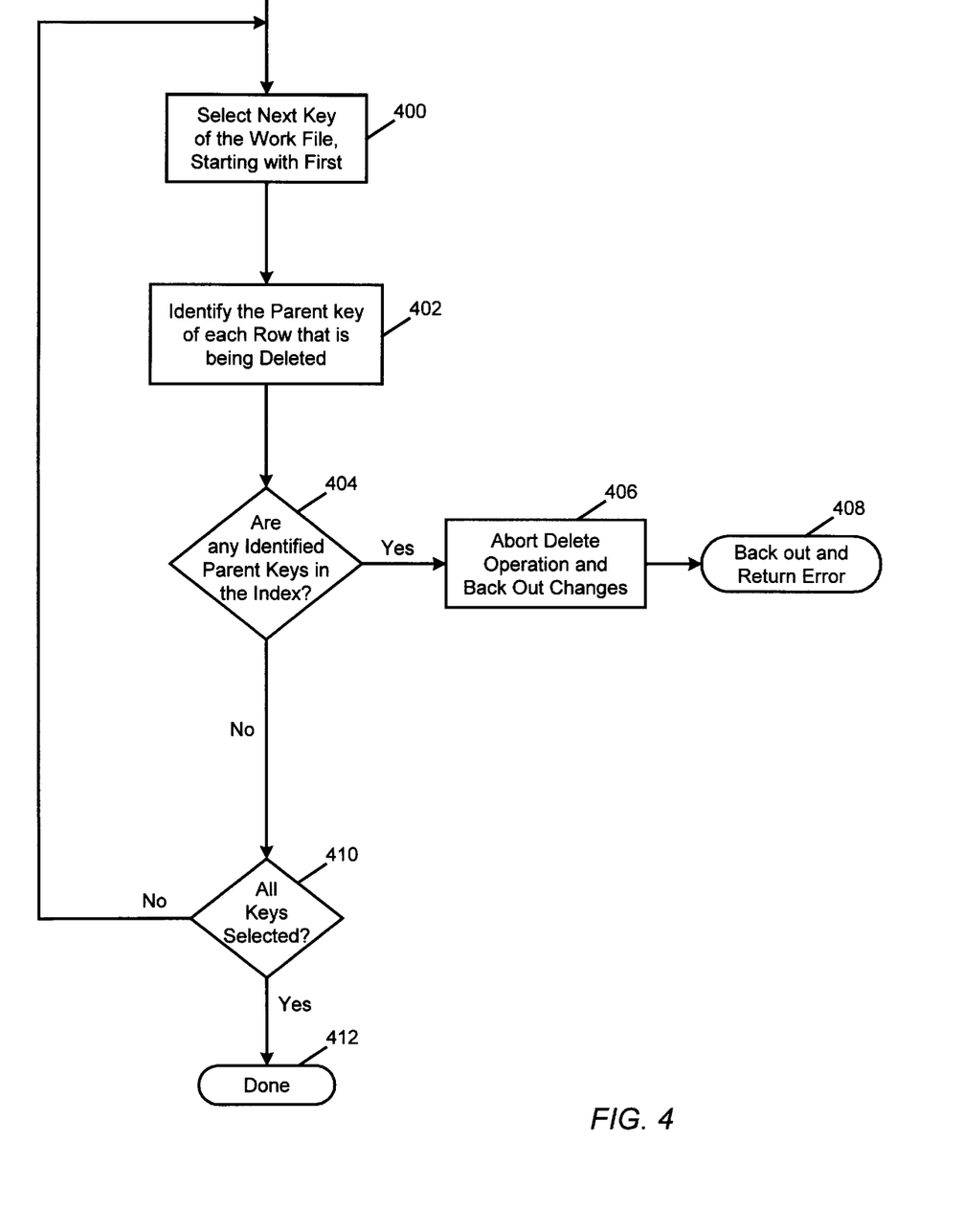
FIG. 4 is a flow diagram illustrating the steps performed by the Data Manager to process a work file for a DELETE rule on a self-referencing table.

FIG. 4 is a flow diagram illustrating the steps performed by the Data Manager 118 to process a work file for a DELETE rule on a self-referencing table. In Block 400, the Data Manager 118 selects the next key in the work file, starting with the first key. In Block 402, the Data Manager 118 identifies the parent key of each row that is being deleted. In Block 404, the Data Manager 118 determines whether there are any identified parent keys in the index. In particular, the Data Manager 118 scans the foreign key index of dependent tables to locate keys that match the identified parent keys. When one or more of these parent keys are found in the index, the Data Manager 118 continues at Block 406, otherwise, the Data Manager 118 continues at Block 410. In Block 406, the Data Manager 118 aborts the delete operation and backs out any changes. In Block 408, the Data Manager 118 backs out the delete and returns an error message indicating that the delete was unsuccessful. In Block 410, the Data Manager 118 determines whether all keys have been selected. When all keys have been selected, the Data Manager 118 continues to Block 412, otherwise, the Data Manager 118 loops back to Block 400 to select the next key for processing. In Block 412, the Data Manager 118 is done processing the work file, and the delete operation is successful.

The following are examples provided to aid understanding of the present invention. In the following examples, the column values for COL2 in TABLE 1 will be modified to create different scenarios.

EXAMPLE 1

Delete is Successful

The following TABLE 3 and its Index contains data used for Example 1, including a row identifier (RID), a parent key (COL1), column data (COL2), and a foreign key reference (COL3). Additionally, the Index contains a key (KEY) and a row identifier (RID).

TABLE 3

| | | | INDEX | | |
|---|---|---|---|---|---|
| RID | COL1 (Parent key) | COL2 | COL3 (Foreign key references COL1) | KEY | RID |
| 00000201 | A | 1 | A | A | 00000201 |
| 00000202 | B | 2 | A | B | 00000202 |
| 00000203 | C | 3 | B | C | 00000203 |
| 00000204 | D | 4 | B | D | 00000204 |
| 00000205 | E | 5 | A | E | 00000205 |
| 00000206 | F | 5 | E | F | 00000206 |
| 00000207 | G | 5 | F | G | 00000207 |
| 00000208 | H | 5 | A | H | 00000208 |
| 00000209 | I | 5 | H | I | 00000209 |
| 0000020A | J | 5 | H | J | 0000020A |
| 0000020B | K | 5 | H | K | 0000020B |

For Example 1, the following statement is executed in which the delete is on a self-referencing table:

DELETE FROM T WHERE COL2=5;

For each row of table T to be deleted, suppose that the delete occurs in the Parent Key (COL1) order. The first row selected for delete would be (E,5,A). Since "E" is a key of the row which is the parent of the row containing the foreign key "F", the data (i.e., row data) and entry for (E,5,A) are deleted and the key "E" is stored in the work file. For the next row (F,5,E), "F" is a key of the row which is the parent of the row containing the foreign key "G", therefore, the row data and index entry are deleted, and the key is stored in the work file. For row (G,5,F), "G" is a key of a row that is not the parent for any other row, so the row data and index entry are deleted. For row (H,5,A), since "H" is a key of a row that is a parent of several rows, the row data and index entry are deleted, and the parent key is stored in the work file. For row (J,5,H), since "J" is a key of a row that is not the parent for any other row, the row data and index entry are deleted. For row (K,5,H), since "K" is a key of a row that is not the parent for any other row, the row data and index entry are deleted.

After processing the DELETE for the rows of the table, the updated data of TABLE 3 would be as shown in TABLE 4:

TABLE 4

| | | INDEX | | | |
|---|---|---|---|---|---|
| RID | COL1 (Parent key) | COL2 | COL3 (Foreign key references COL1) | KEY | RID |
| 00000201 | A | 1 | A | A | 00000201 |
| 00000202 | B | 2 | A | B | 00000202 |
| 00000203 | C | 3 | B | C | 00000203 |
| 00000204 | D | 4 | B | D | 00000204 |

After processing the DELETE for the rows of the table, the work file would contain the following keys: "E", "F", and "H". For each of these keys, their associated index entries are deleted from the Index and their row data is deleted in TABLE 4.

Next, for each key in the work file, the Data Manager 118 performs referential integrity checking. Key "E" has only one dependent key, "F", which is not on the Index (which means that "F" is a possible delete or was already deleted), so Key "E" is deleted from the work file and processing continues to the next key. Key "F" has no dependents, because "G", which was a dependent key, was already deleted earlier, so Key "F" is deleted from the work file and processing continues to the next key. Key "H" has no dependents, because "I", "J" and "K" were already deleted earlier, so Key "H" is deleted from the work file and processing continues to the next key. After processing all of the keys in the work file, if all of them are deleted from the work file, the delete is successful and the work file is deleted.

EXAMPLE 2

Delete is Unsuccessful

The following TABLE 5 and its Index contain data used for Example 2:

TABLE 5

| | | INDEX | | | |
|---|---|---|---|---|---|
| RID | COL1 (Parent key) | COL2 | COL3 (Foreign key references COL1) | KEY | RID |
| 00000201 | A | 1 | A | A | 000201 |
| 00000202 | B | 2 | A | B | 000202 |
| 00000203 | C | 3 | B | C | 000203 |
| 00000204 | D | 4 | B | D | 000204 |
| 00000205 | E | 5 | A | E | 000205 |
| 00000206 | F | 5 | E | F | 000206 |
| 00000207 | G | 5 | F | G | 000207 |
| 00000208 | H | 5 | A | H | 000208 |
| 00000209 | I | 5 | H | I | 000209 |
| 0000020A | J | 6 | H | J | 00020A |
| 0000020B | K | 5 | H | K | 00020B |

For Example 2, the following statement is executed:
DELETE FROM T WHERE COL2=5

For each row of T to be deleted, suppose that the delete occurs in the Parent Key (COL1) order. The first row selected for delete is (E,5,A). Since "E" is a key of a row that is a parent of the row containing key "F", the row data and index entry for row (E,5,A) are deleted and its parent key is stored in the work file. The next row selected for delete is (F,5,E). Since "F" is a key that is a parent of a row containing key "G", the row data and index entry for row (F,5,E) are deleted and its parent key is stored in the work file. Next, for row (G,5,F), since "G" is a key of a row that is not a parent to another row, the row data and its index entry are deleted. For row (H,5,A), since "H" is a key of a parent row that is referenced in other rows, the row data and index entry for this row are deleted, and the parent key is stored in the work file. For row (I,5,H), since "I" is not referenced in other rows, the row data and index entry for this row are deleted. For row (K,5,H), since "K" is not referenced in other rows, the row data and index entry for this row are deleted.

After processing the DELETE for the rows of the table, the updated data of TABLE 5 would be as shown in TABLE 6:

TABLE 6

| | | INDEX | | | |
|---|---|---|---|---|---|
| RID | COL1 (Parent key) | COL2 | COL3 (Foreign key references COL1) | KEY | RID |
| 00000201 | A | 1 | A | A | 00000201 |
| 00000202 | B | 2 | A | B | 00000202 |
| 00000203 | C | 3 | B | C | 00000203 |
| 00000204 | D | 4 | B | D | 00000204 |
| 0000020A | J | 6 | H | J | 0000020A |

After processing the DELETE for the rows of the table, the work file contains the following keys: "E", "F", and "H". For each of these keys, their associated index entries are deleted in the Index and their row data is deleted in TABLE 6.

For each key in the work file, referential integrity checking is performed. Key "E" has only one dependent, "F", which is not on the Index, so Key "E" is deleted from the work file and processing continues to the next key. Key "F" has no dependents, because key "G" was already deleted earlier, so Key "F" is deleted and processing continues to the next key. Key "H" has a dependent "J" remaining in TABLE 6, and keys "I" and "K" were deleted earlier. Referential integrity checking ensures that a parent key is not deleted from a table when foreign keys referencing the parent key remain in the table. The parent key of row (J,6,H) is "J", which exists in the Index. This indicates that key "J" was neither deleted earlier nor is a target for delete, therefore, row (H,5,A) cannot be deleted.

Therefore, the deletes are backed out using data logged in a log file in a typical manner. Then, an error message is returned. When the delete is unsuccessful, the work file is deleted and control is returned to the caller.

EXAMPLE 3

Cycle Relationship in which Delete is Unsuccessful

In Example 3, there is a cycle in the data. In this case, the row (A,1,D) references parent key "D" in row (D,1,B), which references parent key "B" in row (B,1,A), which references parent key "A" in row (A,1,D), making a cycle (i.e., "A" is a child of "D", "D" is a child of "B", and "B" is a child of "A"). The following TABLE 7 and its Index contain data used for Example 3:

TABLE 7

INDEX

| RID | COL1 (Parent key) | COL2 | COL3 (Foreign key references COL1) | KEY | RID |
|---|---|---|---|---|---|
| 00000201 | A | 1 | D | A | 000201 |
| 00000202 | B | 1 | A | B | 000202 |
| 00000203 | C | 1 | B | C | 000203 |
| 00000204 | D | 1 | B | D | 000204 |
| 00000205 | E | 5 | A | E | 000205 |
| 00000206 | F | 5 | E | F | 000206 |
| 00000207 | G | 5 | F | G | 000207 |
| 00000208 | H | 5 | A | H | 000208 |
| 00000209 | I | 5 | H | I | 000209 |
| 0000020A | J | 6 | H | J | 00020A |
| 0000020B | K | 5 | H | K | 00020B |

For Example 3, the following statement is executed:
DELETE FROM T WHERE COL2=1

Initially, the row data and index entries for rows (A,1,D), (B,1,A), (C,1,B), and (D,1,B) are deleted, along with the row data and index entry for (C,1,B). After processing the DELETE for the rows of the table, the work file contains the following keys: "A", "B", and "D".

When referential integrity checking is performed on key "A", its child "E" is still present in the index, so the delete cannot be processed. Therefore, the deletes are backed out, and an error message is returned.

EXAMPLE 4

Cycle relationship, delete is Successful

In Example 4, there is a cycle in the data. In this case, the row (H,6,K) references parent key "K" in row (K,6,H), which, in turn, references parent key "H" in row (H,6,K), making a cycle (i.e., "H" is a child of "K" and "K" is a child of "H"). The following TABLE 8 and its Index contain data used for Example 4:

TABLE 8

INDEX

| RID | COL1 (Parent key) | COL2 | COL3 (Foreign key references COL1) | KEY | RID |
|---|---|---|---|---|---|
| 00000201 | A | 1 | A | A | 000201 |
| 00000202 | B | 1 | A | B | 000202 |
| 00000203 | C | 1 | B | C | 000203 |
| 00000204 | D | 1 | B | D | 000204 |
| 00000205 | E | 5 | A | E | 000205 |
| 00000206 | F | 5 | E | F | 000206 |
| 00000207 | G | 5 | F | G | 000207 |
| 00000208 | H | 6 | K | H | 000208 |
| 00000209 | I | 6 | H | I | 000209 |
| 0000020A | J | 6 | H | J | 00020A |
| 0000020B | K | 6 | H | K | 00020B |

For Example 4, the following statement is executed:
DELETE FROM T WHERE COL2=6

Initially, the row data and index entries for rows (H,6,K), (I,6,H), (J,6,H) and (K,6,H) are deleted and the row data and index entries for rows (I,6,H) and (J,6,H) are also deleted. After processing the DELETE for the rows of the table, the work file contains the following keys: "H" and "K".

When referential integrity checking is performed on the first key, "H", its child, "K", is not present in the index, so Key "H" is deleted from the work file and processing continues to the next key. When referential integrity checking is performed on the next key, "K", its child, "H", is not present in the index, so Key "K" is deleted from the work file. Since all keys have been deleted from the work file, the entire delete is successful.

Multiple-row UPDATE of Parent Keys and Modifications of Foreign Keys that Reference UNIQUE Keys In the present invention, multiple-row updates of parent keys are allowed. The Data Manager 118 of the present invention also enables updating multiple parent keys within one table with one searched update. The Data Manager 118 defers referential integrity checking until all of the updates have been performed.

This type of multiple-row update of parent keys statement is rare. The technique for deferring referential integrity checking is built on the multiple-row update of unique keys. The technique is optimized by keeping track of parent keys that are being updated, and then performing referential integrity checking after all of the updates are completed.

The Data Manager 118 of the present invention allows the update of multiple rows because of a parent key change. The following are examples of this type of SQL statement, in which the column names that start with "PK" are parent keys and those that start with "FK" are foreign keys:

UPDATE T SET PK=PK+1, FK=FK+1;
(i.e., the value of a parent key, PK, is increased by one; the value of a foreign key, FK, is increased by one)

In the present invention, a foreign key can reference a non-parent, unique key. On the other hand, in some systems, a foreign key could only reference a pre-designated parent key. Additionally, in some systems, both the CREATE and ALTER TABLE statements have the FOREIGN KEY clause, but this clause implicitly refers to the parent key of the parent table. In the present invention, the FOREIGN KEY clause is enhanced to refer to a parent key which can be either a unique key or parent key of the parent table.

If the foreign key refers to a non-primary unique key, then the columns of the key are explicitly specified in the REFERENCES sub-clause in the FOREIGN KEY clause. Otherwise, the default is to refer to the columns of the parent key of the parent table. The foreign key defined with the CREATE and ALTER TABLE statements must have the following attributes as the parent key:

The same number of columns.

The same description column by column, except for their names, default values, null attributes and check constraints.

The same field procedure and identical field description, when the field procedure is specified.

The following pseudocode represents the technique of the preferred embodiment of the present invention used to defer referential integrity checking for multiple-row updates of parent keys and foreign keys that reference unique keys:

1. For each row of the table T:
   a. Attempt to identify multiple relationships (i.e., foreign keys that reference unique keys).
   b. If multiple relationships were identified on table T or this is a multiple-row update,
     1) Defer referential integrity checking of the parent key update;

2) If any of the columns being updated is a parent key,
    a) Set the Parent Key updated bit to on; and
    b) Save the Parent Key in a work file for deferred referential integrity checking.
  c. Update the Parent Key and delete its index entry.
  d. Try to insert a new index entry for the updated Parent Key, and if the new index entry is a duplicate of an existing index entry, then save the RID of the row of the updated Parent Key in a RIDLIST and set a defer key processing bit to on.
  e. If any of the columns being updated contain a Foreign Key (FK),
    1) If FK references PK, defer referential integrity checking by saving the Foreign Key in a work file (i.e., when the foreign key is self-referencing, save the key in a work file);
    2) Otherwise, update the Foreign Key.
  f. Perform referential integrity checking for any key for which referential integrity checking is not to be deferred.
  g. If referential integrity checking is unsuccessful, backout and return error.
2. For each row in the RIDLIST, if the defer key processing bit is on,
  a. Insert an index entry for the Parent Key value; and
  b. If duplicate, backout and return error.
3. For each key in the work file, if the parent key updated bit is on,
  a. Perform referential integrity checking on the key's foreign keys, if it is a parent key
  b. Perform referential integrity checking on this key's parent key, if it is a foreign key;
  c. If referential integrity checking is unsuccessful, backout and return error.

Figure 5:
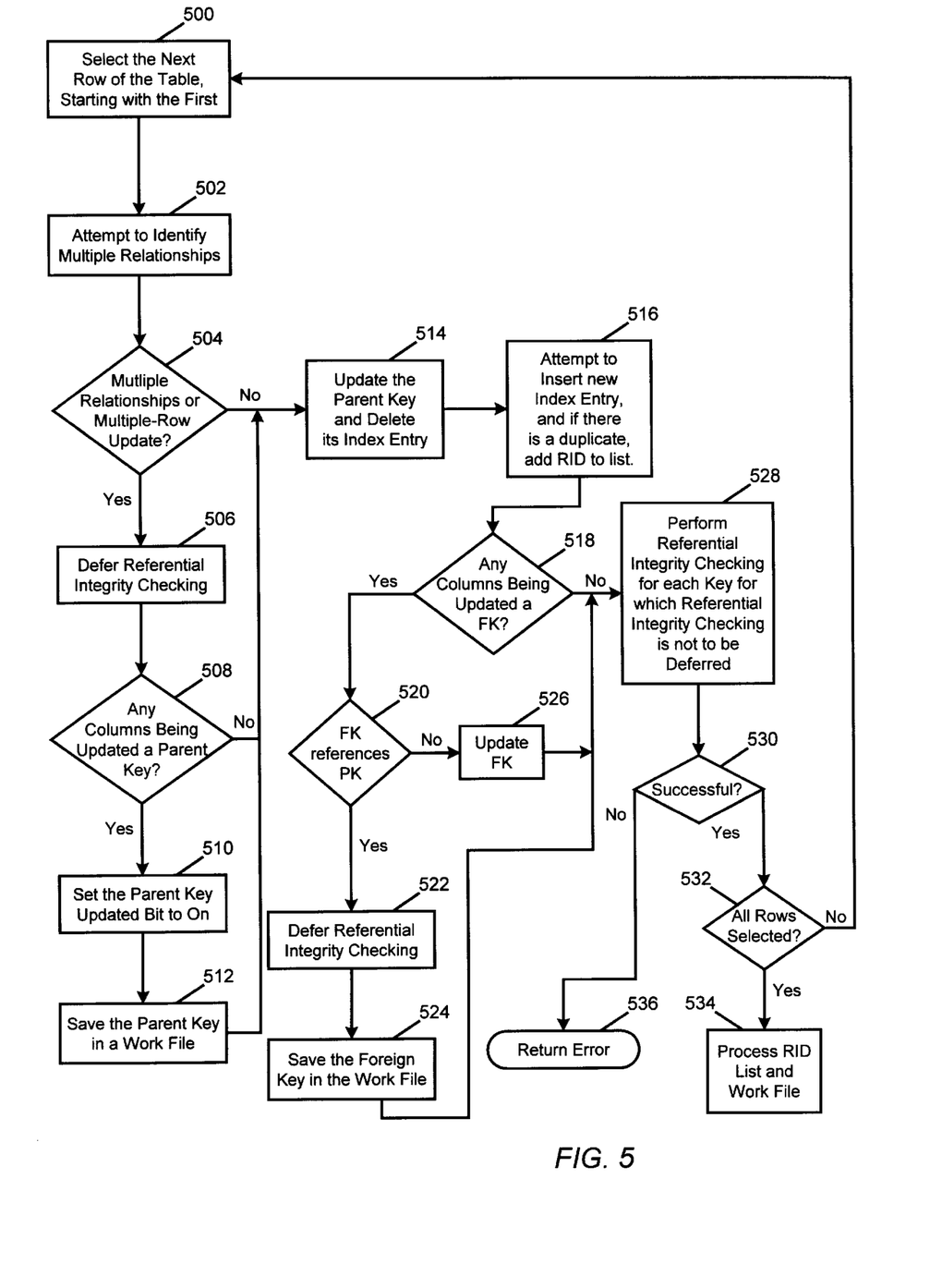
FIG. 5 is a flow diagram illustrating the steps performed by the Data Manager to process modifications of a table for multiple-row updates of parent keys and foreign keys that reference unique keys.

FIG. 5 is a flow diagram illustrating the steps performed by the Data Manager 118 to process modifications of a table for multiple-row updates of parent keys and foreign keys that reference unique keys. In Block 500, the Data Manager 118 selects the next row of the table, starting with the first. In Block 502, the Data Manager attempts to identify multiple relationships (i.e., foreign keys referencing unique keys) or a multiple-row update. In Block 504, the Data Manager 118 determines whether multiple relationships were identified. When multiple relationships are identified, the Data Manager 118 continues to Block 506, otherwise, the Data Manager 118 continues to Block 514. In Block 506, the Data Manager 118 defers referential integrity checking. In Block 508, the Data Manager 118 determines whether any of the columns being updated is a parent key. When any of the columns being updated is a parent key, the Data Manager 118 continues to Block 510, otherwise, the Data Manager 118 continues to Block 514. In Block 510, the Data Manager 118 sets the parent key updated bit to ON. In Block 512, the Data Manager 118 saves the parent key that has not been updated in a work file.

In Block 514, the Data Manager 118 updates the parent key and deletes its index entry. In Block 516, the Data Manager 118 attempts to insert a new index entry, and if there is a duplicate index entry already in the Index, the Data Manager 118 adds the RID of the row to a RID list. In Block 518, the Data Manager 118 determines whether any of the columns being updated is a foreign key. When any of the columns being updated is a foreign key, the Data Manager 118 continues to Block 520, otherwise, the Data Manager 118 continues to Block 528. In Block 520, the Data Manager 118 determines whether the foreign key (FK) references the parent key (PK). When the parent key is in a self-referencing relationship, the Data Manager 118 continues to Block 522, otherwise the Data Manager 118 continues to Block 526. In Block 522, the Data Manager 118 defers referential integrity checking. In Block 524, the Data Manager 118 saves the foreign key in the work file. In Block 526, the Data Manager 118 updates the foreign key.

In Block 528, the Data Manager 118 performs referential integrity checking for each key for which referential integrity checking is not to be deferred. In Block 530, the Data Manager 118 determines whether the referential integrity checking was successful. When the referential integrity checking is successful, the Data Manager 118 continues to Block 532, otherwise the Data Manager 118 continues to Block 536. In Block 532, the Data Manager 118 determines whether all rows have been selected. When all rows have been selected, the Data Manager 118 loops back to Block 500 to select the next row, otherwise, the Data Manager 118 continues to Block 534. In Block 534, the Data Manager 118 processes the RID list and the work file. In Block 536, the Data Manager 118 backs out the updates and returns an error message.

Figure 6:
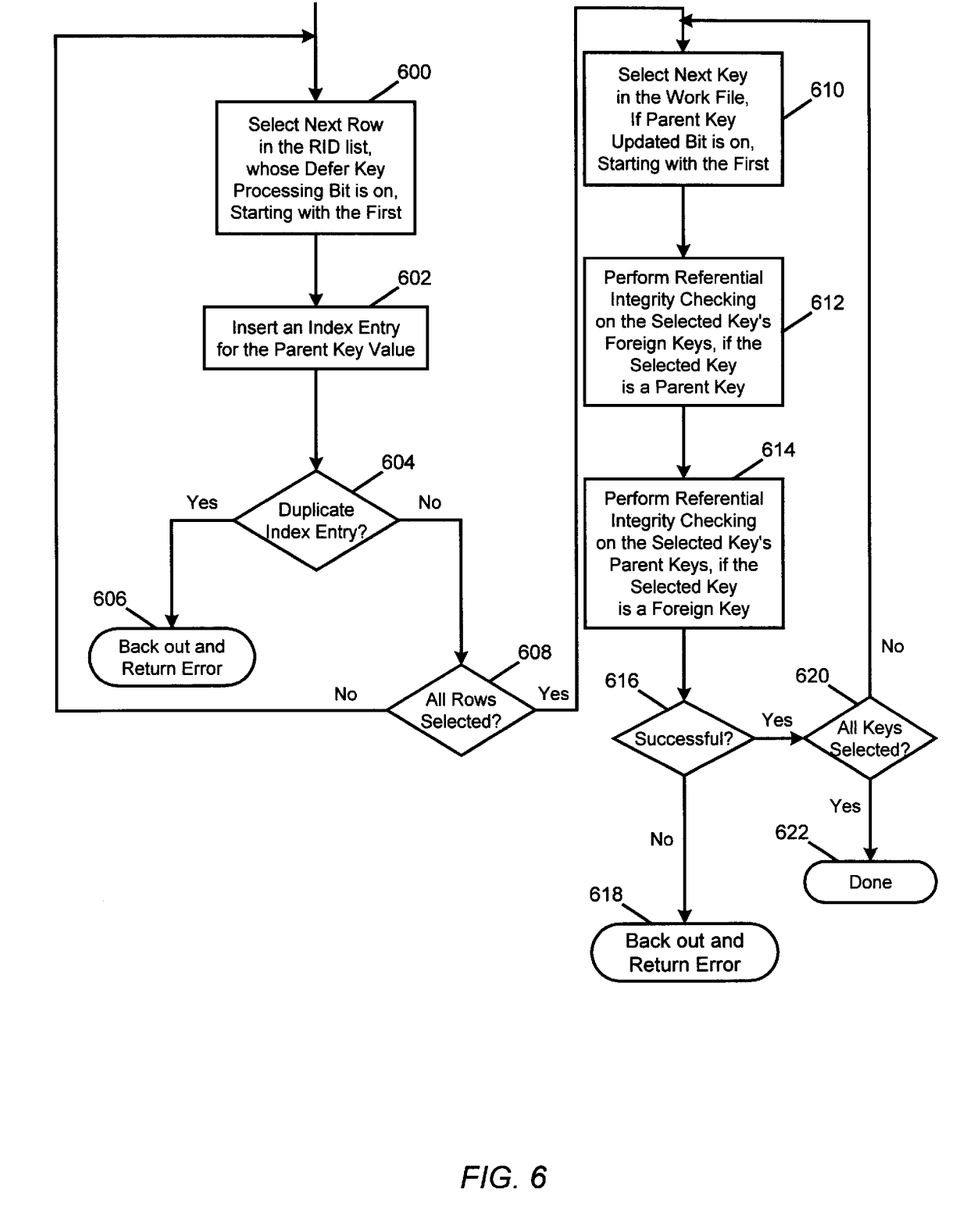
FIG. 6 is a flow diagram illustrating the steps performed by the Data Manager to process a RID list and a work file for modifications of a table for multiple-row updates of parent keys and foreign keys that reference unique keys.

FIG. 6 is a flow diagram illustrating the steps performed by the Data Manager 118 to process a RID list and a work file for modifications of a table for multiple-row updates of parent keys and foreign keys that reference unique keys. In Block 600, the Data Manager 118 selects the next row in the RID list whose defer key processing bit is on, starting with the first. In Block 602, the Data Manager 118 inserts an index entry into the Index for the parent key value. In Block 604, the Data Manager 118 determines whether the inserted index entry is a duplicate of an existing index entry. When the inserted index entry is a duplicate, the Data Manager 118 continues to Block 606, otherwise, the Data Manager 118 continues to Block 608. In Block 606, the Data Manager 118 backs out modifications and returns an error message. In Block 608, the Data Manager 118 determines whether all rows have been selected. When all rows have not been selected, the Data Manager 118 loops back to Block 600 to select the next row, otherwise, the Data Manager 118 continues to Block 610.

In Block 610, the Data Manager 118 selects the next key in the work file if parent key updated bit is on, starting with the first. In Block 612, the Data Manager 118 performs referential integrity checking on the selected key's foreign keys, when the selected key is a parent key. In Block 614, the Data Manager 118 performs referential integrity checking on the selected key's parent key, when the selected key is a foreign key. In Block 616, the Data Manager 118 determines whether the referential integrity checking was successful. When the referential integrity checking is successful, the Data Manager 118 continues to Block 620, otherwise, the Data Manager 118 continues to Block 618. In Block 618, the Data Manager 118 backs out modifications and returns an error message. In Block 620, determines whether all keys have been selected. When all keys have not been selected, the Data Manager 118 loops back to Block 610 to select the next key, otherwise, the Data Manager 118 continues to Block 622. In Block 622, the Data Manager 118 is done, and the modification was successful.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented data manager. The present invention provides the intelligence to select either immediate or deferred referential integrity checking. Moreover, the present invention provides deferred referential integrity checking when executing a delete rule for a self-referencing table. The present invention also provides deferred referential integrity checking for multiple-row updates of a parent key. Additionally, the present invention provides deferred referential integrity checking when modifying tables in which foreign keys reference unique keys.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a computer, the statement being performed by the computer to access data from a database stored on a data storage device connected to the computer, the method comprising the steps of:

determining whether to defer referential integrity checking when executing the statement based on determining whether row-at-a-time referential integrity checking would yield the same results as deferred referential integrity checking; and when it is determined that referential integrity checking is to be deferred, processing each record specified in the statement;

storing parent or foreign keys and a relationship constraint for select records as each record is processed; and automatically, after executing the statement, performing referential integrity checking on the stored parent and foreign keys.

2. The method of claim 1, wherein the step of determining whether to defer referential integrity checking further comprises the step of determining whether the statement indicates a delete rule on a self-referencing table.

3. The method of claim 2, wherein the step of storing keys for select records further comprises:

identifying parent records;

deleting an index entry and row data for each of the identified parent records; and storing keys associated with the identified records.

4. The method of claim 2, wherein the step of performing referential integrity checking on the stored keys, further comprises:

for each of the stored keys, identifying a parent key for each record that is dependent on the stored key's record;

determining whether any identified parent keys are in an index; and when it is determined that any of the identified parent keys are in the index, aborting execution of the delete rule.

5. The method of claim 1, wherein the step of determining whether to defer referential integrity checking further comprises the step of determining whether the statement indicates that a parent key column is updated in multiple records.

6. The method of claim 5, wherein the step of storing keys for select records, further comprises:

for parent keys that are being updated, setting an updated identifier for each parent key; and storing the parent key in a work file.

7. The method of claim 5, further comprising the step of storing record identifiers for select records.

8. The method of claim 7, wherein the step of performing referential integrity checking on the stored keys, further comprises the step of processing each record identifier.

9. The method of claim 5, further comprising the step of, for each self-referencing foreign key that is being updated, deferring referential integrity checking of the foreign key.

10. The method of claim 1, wherein the step of determining whether to defer referential integrity checking further comprises the step of determining whether the statement indicates that one or more foreign keys references a unique key.

11. The method of claim 10, wherein the step of storing keys for select records, further comprises:

for parent keys that are being updated, setting an updated identifier for each parent key; and storing the parent key in a work file.

12. The method of claim 10, further comprising the step of storing record identifiers for select records.

13. The method of claim 12, wherein the step of performing referential integrity checking on the stored keys, further comprises the step of processing each record identifier.

14. The method of claim 10, further comprising the step of, for each self-referencing foreign key that is being updated, deferring referential integrity checking of the foreign key.

15. An apparatus for executing a statement, comprising:

a computer having a data storage device connected thereto, wherein the data storage device stores a database;

one or more computer programs, performed by the computer, for determining whether to defer referential integrity checking when executing the statement based on determining whether row-at-a-time referential integrity checking would yield the same results as deferred referential integrity checking, and when it is determined that referential integrity checking is to be deferred, for processing each record specified in the statement, for storing parent or foreign keys and a relationship constraint for select records as each record is processed, and for, automatically, after executing the statement, performing referential integrity checking on the stored parent and foreign keys.

16. The apparatus of claim 15, wherein the means for determining whether to defer referential integrity checking further comprises the means for determining whether the statement indicates a delete rule on a self-referencing table.

17. The apparatus of claim 16, wherein the means for performing referential integrity checking on the stored keys, further comprises:

for each of the stored keys, means for identifying a parent key for each record that is dependent on the stored key's record;

means for determining whether any identified parent keys are in an index; and means for, when it is determined that any of the identified parent keys are in the index, aborting execution of the delete rule.

18. The apparatus of claim 15, wherein the means for storing keys for select records further comprises:

means for identifying parent records;

means for deleting an index entry and row data for each of the identified parent records; and means for storing keys associated with the identified records.

19. The apparatus of claim 15, wherein the means for determining whether to defer referential integrity checking further comprises the means for determining whether the statement indicates that a parent key column is updated in multiple records.

20. The apparatus of claim 19, wherein the means for storing keys for select records, further comprises:

for parent keys that are being updated,
means for setting an updated identifier for each parent key; and
means for storing the parent key in a work file.

21. The apparatus of claim 19, further comprising the means for storing record identifiers for select records.

22. The apparatus of claim 21, wherein the means for performing referential integrity checking on the stored keys, further comprises the means for processing each record identifier.

23. The apparatus of claim 19, further comprising the means for, for each self-referencing foreign key that is being updated, deferring referential integrity checking of the foreign key.

24. The apparatus of claim 15, wherein the means for determining whether to defer referential integrity checking further comprises the means for determining whether the statement indicates that one or more foreign keys references a unique key.

25. The apparatus of claim 24, wherein the means for storing keys for select records, further comprises:

for parent keys that are being updated,
means for setting an updated identifier for each parent key; and
means for storing the parent key in a work file.

26. The apparatus of claim 24, further comprising the means for storing record identifiers for select records.

27. The apparatus of claim 26, wherein the means for performing referential integrity checking on the stored keys, further comprises the means for processing each record identifier.

28. The apparatus of claim 24, further comprising the means for, for each self-referencing foreign key that is being updated, deferring referential integrity checking of the foreign key.

29. An article of manufacture comprising a computer program carrier readable by a computer and embodying one or more instructions executable by the computer to perform method steps for executing a statement, the statement being performed by the computer to retrieve data from a database stored in a data storage device connected to the computer, the method comprising the steps of:

determining whether to defer referential integrity checking when executing the statement based on determining whether row-at-a-time referential integrity checking would yield the same results as deferred referential integrity checking; and when it is determined that referential integrity checking is to be deferred,
processing each record specified in the statement;
storing parent or foreign keys and a relationship constraint for select records as each record is processed;
automatically, after executing the statement, performing referential integrity checking on the stored parent and foreign keys.

30. The method of claim 29, wherein the step of determining whether to defer referential integrity checking further comprises the step of determining whether the statement indicates a delete rule on a self-referencing table.

31. The method of claim 30, wherein the step of storing keys for select records further comprises:

identifying parent records;

deleting an index entry and row data for each of the identified parent records; and storing keys associated with the identified records.

32. The method of claim 30, wherein the step of performing referential integrity checking on the stored keys, further comprises:

for each of the stored keys,
identifying a parent key for each record that is dependent on the stored key's record;
determining whether any identified parent keys are in an index; and
when it is determined that any of the identified parent keys are in the index, aborting execution of the delete rule.

33. The method of claim 29, wherein the step of determining whether to defer referential integrity checking further comprises the step of determining whether the statement indicates that a parent key column is updated in multiple records.

34. The method of claim 33, wherein the step of storing keys for select records, further comprises:

for parent keys that are being updated,
setting an updated identifier for each parent key; and
storing the parent key in a work file.

35. The method of claim 33, further comprising the step of storing record identifiers for select records.

36. The method of claim 35, wherein the step of performing referential integrity checking on the stored keys, further comprises the step of processing each record identifier.

37. The method of claim 33, further comprising the step of, for each self-referencing foreign key that is being updated, deferring referential integrity checking of the foreign key.

38. The method of claim 29, wherein the step of determining whether to defer referential integrity checking further comprises the step of determining whether the statement indicates that one or more foreign keys references a unique key.

39. The method of claim 38, wherein the step of storing keys for select records, further comprises:

for parent keys that are being updated,
setting an updated identifier for each parent key; and
storing the parent key in a work file.

40. The method of claim 38, further comprising the step of storing record identifiers for select records.

41. The method of claim 40, wherein the step of performing referential integrity checking on the stored keys, further comprises the step of processing each record identifier.

42. The method of claim 38, further comprising the step of, for each self-referencing foreign key that is being updated, deferring referential integrity checking of the foreign key.

* * * * *